US011802545B1

United States Patent
Yarbrough et al.

(10) Patent No.: US 11,802,545 B1
(45) Date of Patent: Oct. 31, 2023

(54) METHOD AND SYSTEM FOR DETECTION AND MITIGATION OF EDGE-WISE VIBRATIONS IN WIND TURBINE BLADES

(71) Applicant: General Electric Company, Schenectady, NY (US)

(72) Inventors: Aaron Yarbrough, Greenville, SC (US); Mathew Doyle Angel, Greenville, SC (US); Carlos Alberto Concha Flores, Greer, SC (US); Aaron David Honnette, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/952,523

(22) Filed: Sep. 26, 2022

(51) Int. Cl.
*F03D 7/02* (2006.01)

(52) U.S. Cl.
CPC ........... *F03D 7/0224* (2013.01); *F03D 7/024* (2013.01); *F03D 7/0296* (2013.01);
(Continued)

(58) Field of Classification Search
CPC ...... F03D 7/0224; F03D 7/0296; F03D 7/024; F05B 2270/32; F05B 2270/334; F05B 2270/602; F05B 2270/604; F05B 2260/96
See application file for complete search history.

(56) References Cited

U.S. PATENT DOCUMENTS

| 4,584,486 A | 4/1986 | Quynn |
| 7,854,589 B2 | 12/2010 | Nielsen et al. |

(Continued)

FOREIGN PATENT DOCUMENTS

| EP | 2097642 A2 | 9/2009 |
| EP | 2463517 B1 | 6/2014 |
| EP | 2084400 B1 | 8/2017 |

OTHER PUBLICATIONS

Dixit et al., Towards Pitch-Scheduled Drive Train Damping in Variable-Speed, Horizontal-Axis Large Wind Turbines, MOlB18.6, Proceedings of the 44th IEEE Conference on Decision Control, and the European Control Conference 2005, Seville Spain, Dec. 12-15, 2005, pp. 1295-1300. Retrieved Sep. 1, 2022 from Webpage: https://folk.ntnu.no/skoge/prost/proceedings/cdc-ecc05/pdffiles/papers/2938.pdf.

(Continued)

*Primary Examiner* — Christopher Verdier
*Assistant Examiner* — Ryan C Clark
(74) *Attorney, Agent, or Firm* — Dority & Manning, P.A.

(57) ABSTRACT

A method for detecting and reducing edgewise vibrations in a rotor blade of a wind turbine includes, for a given wind speed, determining a frequency or frequency band at which edgewise vibrations are producible in the rotor blade. The method determines an electrical characteristic of the pitch actuator that correlates to an increased torque required to hold a pitch angle of the rotor blade constant at the frequency or frequency band. During an operational power-production mode of the wind turbine, the electrical characteristic of the pitch actuator is monitored. Upon the electrical characteristic reaching a predefined limit value indicative of edgewise vibrations in the rotor blade, corrective action is initiated by the wind turbine controller to reduce or prevent the edgewise vibrations.

17 Claims, 5 Drawing Sheets

(52) U.S. Cl.
CPC ....... *F05B 2260/96* (2013.01); *F05B 2270/32* (2013.01); *F05B 2270/334* (2013.01); *F05B 2270/602* (2013.01); *F05B 2270/604* (2013.01)

(56) References Cited

U.S. PATENT DOCUMENTS

| | | | |
|---|---|---|---|
| 7,895,018 B2 | 2/2011 | Nies | |
| 8,038,395 B2* | 10/2011 | Fric | F03D 7/042 416/1 |
| 8,057,175 B2* | 11/2011 | Vadari | F03D 7/0224 416/37 |
| 8,070,437 B2 | 12/2011 | Nielsen et al. | |
| 9,004,862 B2 | 4/2015 | Miranda | |
| 9,261,080 B2 | 2/2016 | Egedal et al. | |
| 9,316,206 B2 | 4/2016 | Laurberg | |
| 9,658,124 B2* | 5/2017 | Drack | G01F 1/00 |
| 10,982,649 B2* | 4/2021 | Danielsen | F03D 7/0224 |
| 11,118,567 B2* | 9/2021 | Kachhia | F03D 1/0691 |
| 2009/0004005 A1 | 1/2009 | Jeppesen | F03D 7/024 416/1 |
| 2010/0181769 A1* | 7/2010 | Altemark | F03D 7/028 318/434 |
| 2010/0209243 A1 | 8/2010 | Birkemose et al. | |
| 2012/0119496 A1* | 5/2012 | Siegfriedsen | F03D 17/00 290/44 |
| 2012/0257967 A1* | 10/2012 | Egedal | F03D 7/0224 416/1 |
| 2013/0209254 A1* | 8/2013 | Hess | F03D 7/043 416/1 |
| 2014/0003936 A1* | 1/2014 | Agarwal | F03D 7/0276 416/1 |
| 2019/0113022 A1* | 4/2019 | Grunnet | F03D 7/045 |
| 2019/0128242 A1* | 5/2019 | Grunnet | F03D 7/0224 |
| 2019/0222103 A1* | 7/2019 | Nedrehagen | H02K 16/00 |
| 2020/0124022 A1* | 4/2020 | Janssen | F03D 7/047 |
| 2020/0263666 A1* | 8/2020 | Pedersen | F03D 7/0224 |
| 2021/0231102 A1* | 7/2021 | Thomsen | F03D 7/0296 |

OTHER PUBLICATIONS

Larsen et al., Modal Analysis of Wind Turbine Blades, DTU Library, Risoe-R No. 1181(EN), Riso National Laboratory, Roskilde Denmark, 2002, 73 Pages. Retrieved Sep. 1, 2022 from Webpage: https://backend.orbit.dtu.dk/ws/portalfiles/portal/7712483/ris_r_1181. pdf.

Lindenburg, Aeroelastic Modelling of the LMH64-5 Blade, DOWEC-02-L-083/0, Dec. 2002, 42 Pages. Retrieved Sep. 1, 2022 from Webpage: https://citeseerx.ist.psu.edu/viewdoc/download?doi=10.1.1.475.7675&rep=rep1&type=pdf.

Lindenburg et al., Structural Pitch for a Pitch-to-Vane Controlled Wind Turbine Rotor, ECN-C-03-087, DAMPBLADE Project, Task 3.4: Design Application, Sensitivity Analysis and Aeroelastic Tailoring, Oct. 2004, 79 Pages.

Petersen et al., Prediction of Dynamic Loads and Induced Vibrations in Stall, Riso-R-1045(EN), RISO, Riso National Laboratory, Roskilde Denmark, May 1998, 162 Pages. (Part A and Part B) Retrieved Sep. 1, 2022 from Webpage: https://www.osti.gov/etdeweb/servlets/purl/321681.

Rasmussen et al., Dynamic Stall and Aerodynamic Damping, Journal of Solar Energy Engineering, vol. 121, Issue 3, Aug. 1999, pp. 150-155. (Abstract Only) Retrieved Sep. 1, 2022 from Webpage: https://asmedigitalcollection.asme.org/solarenergyengineering/article-abstract/121/3/150/437751/Dynamic-Stall-and-Aerodynamic-Damping?redirectedFrom=fulltext.

Thomsen et al., A Method for Determination of Damping for Edgewise Blade Vibrations, Wind Energy, vol. 3, Issue 4, Sep. 11, 2001, pp. 233-246. (Abstract Only) Retrieved Sep. 1, 2022 from Webpage: https://onlinelibrary.wiley.com/doi/10.1002/we.42.

* cited by examiner

METHOD AND SYSTEM FOR DETECTION AND MITIGATION OF EDGE-WISE VIBRATIONS IN WIND TURBINE BLADES

FIELD

The present disclosure relates in general to wind turbine power generating systems, and more particularly to systems and methods for detecting and mitigating edgewise vibrations in the rotor blades of a wind turbine power generating system.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven") or through the use of a gearbox. This way, the generator produces electricity which can be supplied to the electrical grid.

There is a trend to make wind turbine blades increasingly longer to capture more wind and convert the energy of the wind into electricity. This results in the blades being more flexible and more prone to aero-elastic instabilities, e.g., vibrations of the blades, which create risk of major potential damages in the entire wind turbine. Edgewise vibrations in the blades (defined generally as vibrations that propagate in a chord-wise direction between the leading and trailing edges of the blade) are particularly problematic in that they can lead to cracks in the blade and complete failure of the blade.

When edgewise vibrations are detected in the blades, corrective action may include shutting down the turbine, which is disadvantageous in that the wind turbine can no longer contribute to energy production. In this regard, other solutions have been proposed to prevent or minimize the edgewise vibrations without shutting down the wind turbine. For example, mechanical or liquid dampers have been proposed wherein such dampers are placed at or near the blade tip and are designed ("tuned") to prevent the blade from vibrating at its natural (eigen) frequencies. This solution, however, can be disadvantageous in that the damping devices add weight, complexity, and cost to the blades, including inspection and maintenance thereof.

EP 2084400B1 proposes a method and system wherein a pitch-controlled wind turbine includes detection means in the form of one or more oscillation sensors for detecting edgewise oscillations in the blades. Control means are configured to change the pitch angle of the blades by turning the blades in a direction making the blade chord more parallel with the direction of the relative wind if the sensors detect edgewise oscillations in one or more of the blades. The oscillation sensors may be accelerometers connected to the strengthening structure in the nacelle.

U.S. Pat. No. 9,316,206 proposes a method and system for determining a common blade frequency resulting from a common vibrational movement due to mutual interactions between members of a rotor in a wind turbine, the wind turbine comprising a tower, a nacelle, and a plurality of rotatable blades, wherein each rotatable blade exhibits a blade edge frequency. An accelerometer or a strain gauge is placed in the tower or nacelle to measure a vibration quantity of the tower or nacelle, and the common blade frequency is based on the measured vibration quantity. Specifically, the frequency spectrum of the vibration quantity includes at least one peak corresponding to a maximum signal in a frequency range equal to or approximating the common blade frequency. In the operational mode, the wind turbine controller will change a setting when the common blade frequency is detected, including setting the wind turbine in a shutdown or standby mode, or changing a rotor rotational speed.

In general, the conventional sensor-dependent solutions, including those discussed above, require the expense, weight, and complexity of one or more sensors, including the processing capability needed to interpret the sensor readings.

The industry would benefit from a methodology and associated system that effectively detects or predicts edgewise blade oscillations without the necessity of sensors attached to the blades or other rotor structure to directly or indirectly the blade vibrations. The present disclosure provides examples of operational methods and systems for wind turbines in this regard.

BRIEF DESCRIPTION

Aspects and advantages of the invention will be set forth in part in the following description, or may be obvious from the description, or may be learned through practice of the invention.

The present disclosure encompasses a method for detecting and reducing edgewise vibrations in a rotor blade of a wind turbine, wherein the wind turbine includes a rotor with a plurality of the rotor blades, a wind turbine controller, and a pitch control system with a pitch actuator configured with each of the rotor blades. The method includes: (a) for a given wind speed, determining a frequency or frequency band at which edgewise vibrations are producible in the rotor blade; (b) determining an electrical characteristic of the pitch actuator that correlates to an increased torque required from the pitch actuator to hold a pitch angle of the rotor blade constant at the frequency or frequency band; (c) monitoring the electrical characteristic of the pitch actuator; and (d) upon the electrical characteristic reaching a predefined limit value indicative of edgewise vibrations being or about to be induced in the rotor blade, with the wind turbine controller initiating corrective action to reduce or prevent the edgewise vibrations.

In a particular embodiment, the steps (a) and (b) are conducted in an analysis phase on a test wind turbine with test pitch actuators and test rotor blades having similar operational characteristics as the wind turbine pitch actuator and rotor blade. For example, the analysis phase may be conducted using blades of a same type, model, or design as the blades on the operational wind turbine. The values of the electrical characteristic of the test pitch actuator are correlated to the increased torque of the test pitch actuator are stored in a memory accessible by the controller during the operational power-production mode of the wind turbine. The test pitch actuator is likewise of the same type, model, or design as the pitch actuators in the operational wind turbine.

In addition, the steps (a) and (b) conducted in the analysis phase on the test wind turbine may be conducted at a plurality of different wind speeds.

In still another embodiment, the steps (a) and (b) may be determined via an physical or computer-implemented modeling process based on the relevant characteristics of the operational wind turbine.

Alternatively, the steps (a) and (b) may be conducted in a pre-operational mode of the actual operational wind turbine, and wherein values of the electrical characteristic of the pitch actuator correlated the increased torque of the pitch actuator are stored in a memory accessible by the wind turbine controller during the operational power-production mode of the wind turbine. The steps (a) and (b) may be conducted in the pre-operational mode on the wind turbine at a plurality of different wind speeds.

In certain embodiments, the pitch actuators are pitch motors and the electrical characteristic includes one or more of: pitch motor current, pitch motor voltage, pitch motor power, or pitch motor torque.

In an alternative embodiment, the pitch actuator are a hydraulic actuator and the electrical characteristic includes a signal for one or both of: hydraulic pitch system torque or hydraulic system actuation pressure.

In certain embodiments, the corrective action initiated by the controller is any one or combination of: pitching the rotor blade to a different pitch position to reduce individual blade loading, yawing the rotor to reduce blade loading on all of the rotor blades, and shutting down the wind turbine.

The method may include conducting the steps (c) and (d) individually for each of the rotor blades of the wind turbine.

Step (c) of the method may include monitoring the electrical characteristic during an operational power production mode of the wind turbine. Alternately, the monitoring step may be conducted during a mode wherein the wind turbine is not producing power, but power is still provide to the pitch actuators.

The present disclosure also encompasses a wind turbine having a plurality of rotor blades on a rotatable rotor hub. A pitch system is provided to change a pitch angle of the rotor blades, the pitch system including an individual pitch actuator configured with each rotor blade. A controller is provided in operable communication with the pitch system, the controller configured to: at a given wind speed during an operational power-production mode of the wind turbine, controlling the pitch actuators to maintain the rotor blades at a desired pitch angle; monitor one or mor electrical characteristics of the individual pitch actuators; and for each of the pitch actuators, upon the electrical characteristic reaching a predefined limit value indicative of edgewise vibrations being or about to be induced in the rotor blade, initiating corrective action to reduce or prevent the edgewise vibrations.

In a particular embodiment, the controller is in communication with a memory storage device that contains stored values of the electrical characteristic of the pitch actuators correlated to an increased torque required from the pitch actuator to maintain the pitch position of the rotor blade constant at a blade frequency or frequency band known to induce edgewise vibrations in the rotor blade.

The memory storage device may contain the stored values of the electrical characteristic determined for a plurality of different wind speeds.

In certain embodiments, the pitch actuator is a pitch motor and the electrical characteristic includes one or more of: pitch motor current, pitch motor voltage, pitch motor power, or pitch motor torque.

In other embodiments, the pitch actuator is a hydraulic actuator and the electrical characteristic includes a signal for one or both of: hydraulic pitch system torque or hydraulic system actuation pressure.

In particular embodiments, the corrective action initiated by the controller may be any one or combination of: pitching the rotor blade to a different pitch position to reduce individual blade loading, yawing the rotor to reduce blade loading on all of the rotor blades, and shutting down the wind turbine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
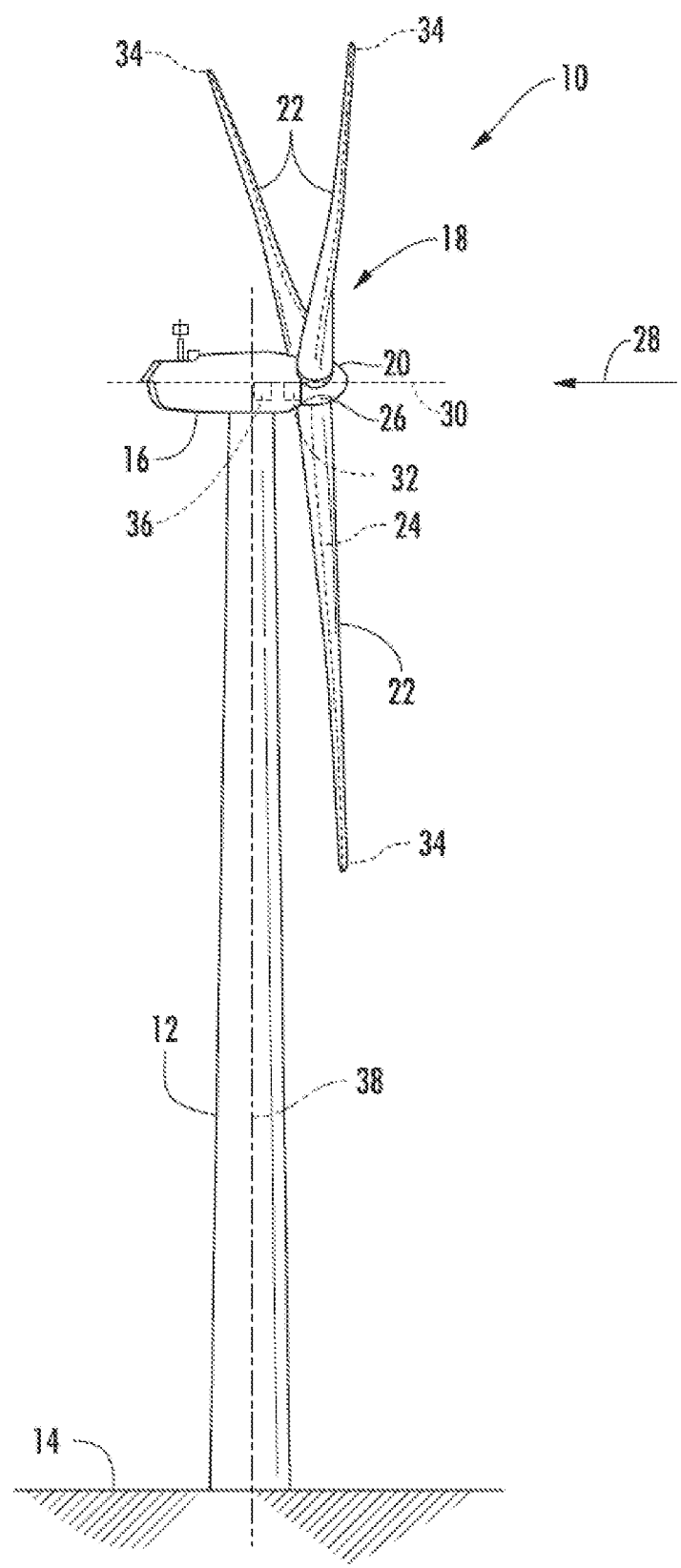
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Aspects of the present methodology and related systems are premised on the unique appreciation of the electromechanical states and interaction of the pitch actuator and associated rotor blade. Because the rotor blade, pitch bearing, and the pitch actuator are all connected kinematically, the power demand on the actuator (namely voltage and torque signals) can be correlated to blade loads at frequencies observed to cause aeroelastic instabilities, resonance, or other potential excitations of the blade, including edgewise blade vibrations or oscillations. The invention proposes use of the pitch actuator itself as a means to monitor for blade instabilities, especially edgewise vibrations. With this solution, it is not necessary to incur the costs and complexity of dedicated sensors typically used in the industry for this purpose, such as tower top accelerometers, strain gages, or other sensing technology.

For example, in the case wherein the pitch actuators are pitch motors, the electrical current drawn by the pitch motor reflects the torque demand on the motor, wherein the torque is predominately due to the force required to hold the rotor blade at a fixed pitch angle (i.e., resisting aero and body forces and pitching moments acting on the rotor blade) or the force required to move the blade to a new pitch angle. With respect to edgewise excitations acting on the rotor blade, the torque about the pitch axis of the rotor blade is highly sensitive to such loads. The present disclosure recognizes that this torque can be correlated to the edgewise loads at a specific blade frequency (or frequency band) known to induce the edgewise vibrations. Thus, the electrical characteristics of the pitch motor (e.g., voltage, current, and/or power) can also be correlated to the magnitude of the edgewise loads acting on the rotor blade at the specific frequency band.

Referring now to the drawings, FIG. 1 illustrates a perspective view of one embodiment of a wind turbine 10 according to the present disclosure. In the illustrated embodiment, the wind turbine 10 is a horizontal-axis wind turbine. Alternatively, the wind turbine 10 may be a vertical-axis wind turbine. In addition, as shown, the wind turbine 10 includes a tower 12 that extends from a support system 14, a nacelle 16 mounted on tower 12, and a rotor 18 that is coupled to nacelle 16. The rotor 18 includes a rotatable hub 20 and at least one rotor blade 22 coupled to and extending outward from hub 20. Moreover, as shown, the rotor 18 has three rotor blades 22. In an alternative embodiment, the rotor 18 includes more or less than three rotor blades 22. In an embodiment, the tower 12 is fabricated from tubular steel to define a cavity (not shown in FIG. 1) between support system 14 and nacelle 16. In an alternative embodiment, the tower 12 is any suitable type of tower having any suitable height.

The rotor blades 22 are spaced about the hub 20 to facilitate rotating the rotor 18 to enable kinetic energy to be transferred from the wind into usable mechanical energy, and subsequently, electrical energy. Further, the rotor blades 22 are generally secured to the hub 20 by coupling a blade root portion 24 to the hub 20 at a plurality of load transfer regions 26. The load transfer regions 26 have a hub load transfer region and a blade load transfer region (both not shown in FIG. 1). As such, loads induced to the rotor blades 22 are transferred to the hub 20 via the load transfer regions 26.

Thus, as wind strikes the rotor blades 22 from a direction 28, the rotor 18 is rotated about an axis of rotation 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle or blade pitch of the rotor blades 22, i.e., an angle that determines a perspective of the rotor blades 22 with respect to the direction 28 of the wind, may be changed by a pitch control system 32 to control the load and power generated by the wind turbine 10 by adjusting an angular position of at least one rotor blade 22 relative to wind vectors. Pitch axes 34 for the rotor blades 22 are shown. During operation of the wind turbine 10, the pitch control system 32 may supply power to a pitch actuator, such as a motor, to counteract forces acting on the blade 22 and maintain a constant pitch angle of the blades 22 desired for the prevailing wind conditions. The pitch control system 32 may also change the pitch angle of the blades 22 such that the rotor blades 22 are moved to a feathered position wherein the perspective of the rotor blade 22 relative to wind vectors provides a minimal surface area of the rotor blade 22 to be oriented towards the wind vectors, which facilitates reducing a rotational speed of the rotor 18 and/or facilitates a stall of the rotor 18.

In one embodiment, the blade pitch of each rotor blade 22 is controlled by an individual controller 36. Alternatively, the blade pitch for all rotor blades 22 may be controlled simultaneously by a single controller 36. In an embodiment, the controller 36 is shown as being centralized within the nacelle 16, however, the controller 36 may be a distributed system throughout the wind turbine 10, on the support system 14, within a wind farm, and/or at a remote control center. The single controller 36 or multiple controllers 36 may be integrated with an overall wind turbine controller.

Still referring to FIG. 1, as the wind direction 28 changes, a yaw direction of the nacelle 16 may be controlled about a yaw axis 38 to position the rotor blades 22 with respect to the wind direction 28.

Figure 2:
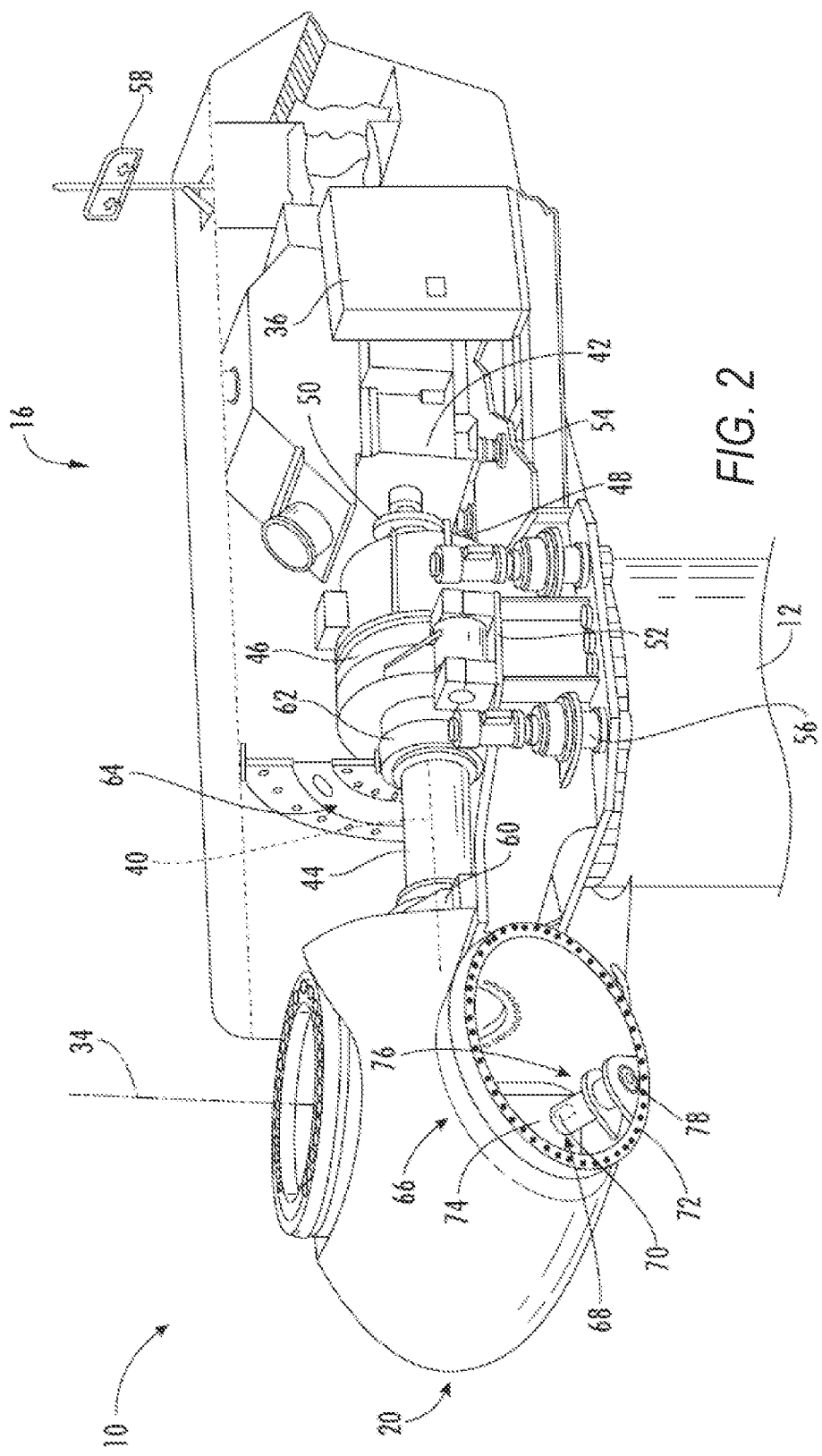
FIG. 2 illustrates an enlarged sectional view of a portion of the wind turbine shown in FIG. 1.

Referring now to FIG. 2, an enlarged sectional view of a portion of the wind turbine 10 is illustrated according to the present disclosure. In this embodiment, the hub 20 is rotatably coupled to a generator 42 positioned within the nacelle 16 by rotor shaft 44 (sometimes referred to as either a main shaft or a low speed shaft), a gearbox 46, a high-speed shaft 48, and a coupling 50. The rotor shaft 44 is disposed coaxial to longitudinal axis 40 and rotation of the rotor shaft 44 rotatably drives the gearbox 46 that subsequently drives the high-speed shaft 48. The high-speed shaft 48 rotatably drives the generator 42 with the coupling 50, wherein rotation of the high-speed shaft 48 facilitates production of electrical power by the generator 42. The gearbox 46 and the generator 42 are supported by supports 52, 54. Further, the gearbox 46 utilizes a dual path geometry to drive the high-speed shaft 48. Alternatively, the rotor shaft 44 may be coupled directly to the generator 42 with the coupling 50.

The nacelle 16 also includes a yaw drive mechanism 56 that may be used to rotate the nacelle 16 and the hub 20 on a yaw axis 38 (shown in FIG. 1) to control the perspective of rotor blades 22 with respect to direction 28 of the wind.

The nacelle 16 may include at least one meteorological mast 58 that includes a wind vane and anemometer (neither shown in FIG. 2). As such, in an embodiment, the mast 58 provides information to the controller 36 that may include wind direction and/or wind speed.

In addition, as shown in the illustrated embodiment, the nacelle 16 also includes a main forward support bearing 60 and a main aft support bearing 62.

Still referring to FIG. 2, the forward support bearing 60 and the aft support bearing 62 facilitate radial support and alignment of the rotor shaft 44. The forward support bearing 60 is coupled to the rotor shaft 44 near the hub 20. The aft support bearing 62 is positioned on the rotor shaft 44 near the gearbox 46 and/or the generator 42. Alternatively, the nacelle 16 includes any number of support bearings that enable the wind turbine 10 to function as disclosed herein. The rotor shaft 44, the generator 42, the gearbox 46, the high-speed shaft 48, the coupling 50, and/or any associated fastening, support, and/or securing device including, but not limited to, the supports 52, 54, and the forward support bearing 60 and aft support bearing 62, are sometimes referred to as a drive train 64, in the example as geared drive train.

In other examples, the geared drive train 64 may be replaced by a direct-drive train. For example, a comparatively long main shaft connects the hub 20 and the generator 42. The main shaft 44 and the generator shaft 48 are typically coupled via a conical sleeve coupling. The main shaft 44 is typically supported by a front bearing, for example a spherical roller bearing, next to the hub 20 and a rear bearing, for example a CARB bearing, next to the generator 42. The front bearing and the rear bearing are connected to a bedplate and configured to transfer axial loads and bending loads to the bedplate mounted to nacelle 16. The generator 42 is hanging on the main shaft 44. Further torque beams may be provided between the generator 42 and the bedplate to transfer torque to the bedplate during operation of the wind turbine 10.

The pitch control system discussed above with respect to FIG. 1 may include a pitch assembly 66. For example, as shown in FIG. 2, the pitch assembly 66 may include a pitch drive systems 68 and a sensor 70 configured with each respective rotor blade 22 for modulating the blade pitch of associated rotor blade 22 along pitch axis 34. Only one of three pitch drive systems 68 is shown in FIG. 2.

In the illustrated embodiment depicted in the figures in general, the pitch control assembly includes individual pitch actuators in the form of motors. It should be appreciated, however, that this is for illustrative purposes. The present invention is not limited to pitch motors and includes any manner of actuators or actuation systems configured for pitching and holding the blades at a desired pitch angle.

In the illustrated embodiment, the pitch assembly 66 includes at least one pitch bearing 72 coupled to the hub 20 and to the respective rotor blade 22 (shown in FIG. 1) for rotating the respective rotor blade 22 about the pitch axis 34. The pitch drive system 68 includes a pitch drive motor 74 coupled to a pitch drive gearbox 76 that rotationally drives a pitch drive pinion 78. The pitch bearing 72 is coupled to the pitch drive pinion 78 such that the rotation of the pitch drive pinion 78 causes rotation of the pitch bearing 72. More specifically, in an embodiment, the pitch drive pinion 78 is coupled to the pitch bearing 72 such that rotation of the pitch drive gearbox 76 rotates the pitch bearing 72 and the rotor blade 22 about the pitch axis 34 to change the blade pitch of the rotor blade 22. Further, the pitch drive system 68 is coupled to the controller 36 for adjusting the blade pitch of the rotor blade(s) 22 upon receipt of one or more signals from the controller 36.

Figure 3:
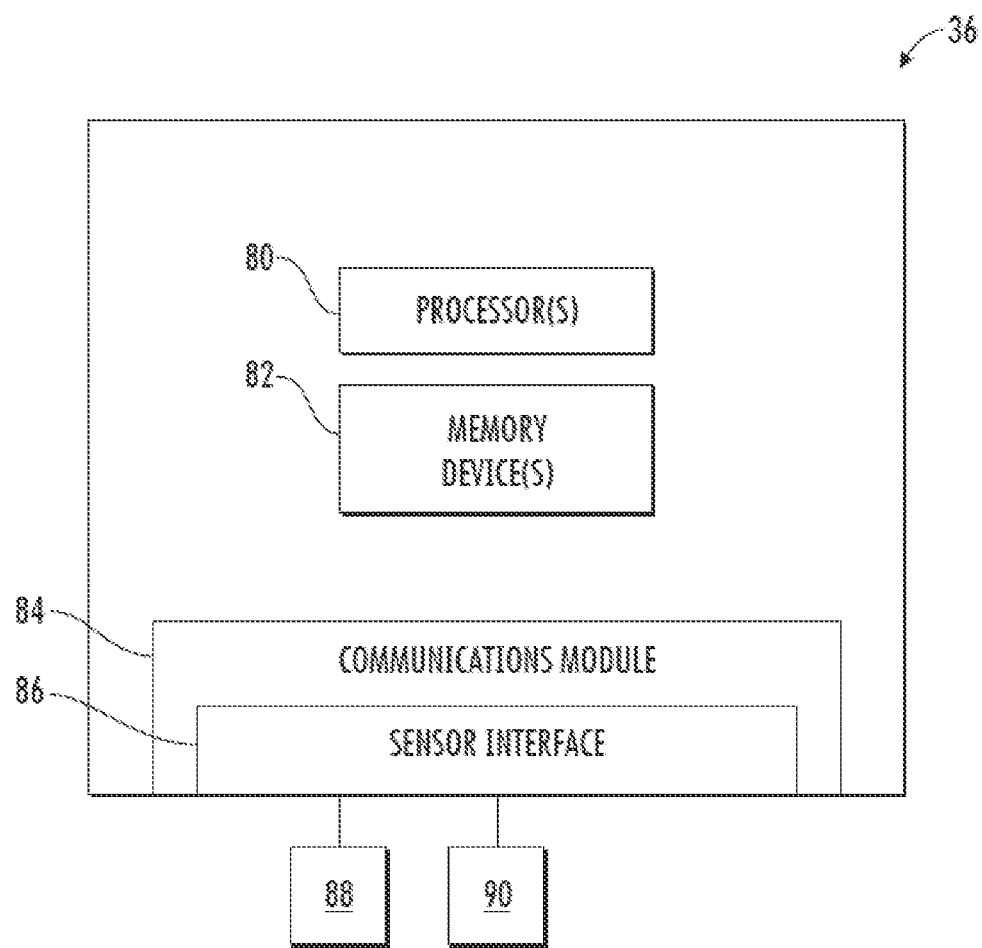
FIG. 3 illustrates a block diagram of one embodiment of suitable components that may be included in a controller of a wind turbine according to the present disclosure.

Referring now to FIG. 3, a block diagram of one embodiment of suitable components that may be included within the controller 36 in accordance with aspects of the present disclosure is illustrated. It should be understood that the various components of the controller of FIG. 3 may be applicable to any suitable controller, including for example, a turbine controller, a farm-level controller, a supervisory controller, and/or other suitable control system.

As shown, the controller 36 may include one or more processor(s) 80 and associated memory device(s) 82 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 82 may generally include memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Additionally, the controller 36 may also include a communications module 84 to facilitate communications between the controller 36 and the various components of the wind turbine 10. For instance, the communications module 84 may include a sensor interface 86 (e.g., one or more analog-to-digital converters) to permit the signals transmitted by one or more sensors 88, 90 to be converted into signals that can be understood and processed by the controller 36. It should be appreciated that the sensors 88, 90 may be communicatively coupled to the communications module 84 using any suitable means. For example, as shown in FIG. 3, the sensors 88, 90 are coupled to the sensor interface 86 via a wired connection. However, in other embodiments, the sensors 88, 90 may be coupled to the sensor interface 86 via a wireless connection, such as by using any suitable wireless communications protocol known in the art. As such, the processor 80 may be configured to receive one or more signals from the sensors 88, 90.

The sensors 88, 90 of the wind turbine 10 may be any suitable sensors configured to measure any operational condition and/or wind parameter at or near the wind turbine 10. For example, the sensors 88, 90 may include blade sensors for measuring a pitch angle of one of the rotor blades 22; generator sensors for monitoring the generator 42 (e.g., torque, rotational speed, acceleration and/or the power output); and/or various wind sensors for measuring various wind parameters. In addition, the sensors 88, 90 may be located near the ground of the wind turbine 10, on the nacelle 16, and/or on the meteorological mast 58.

As discussed above, the present method and related operational configuration do not rely on sensors 88, 90 to detect (directly or indirectly) actual edgewise vibrations or oscillations being induced in the rotor blades.

Figure 4:
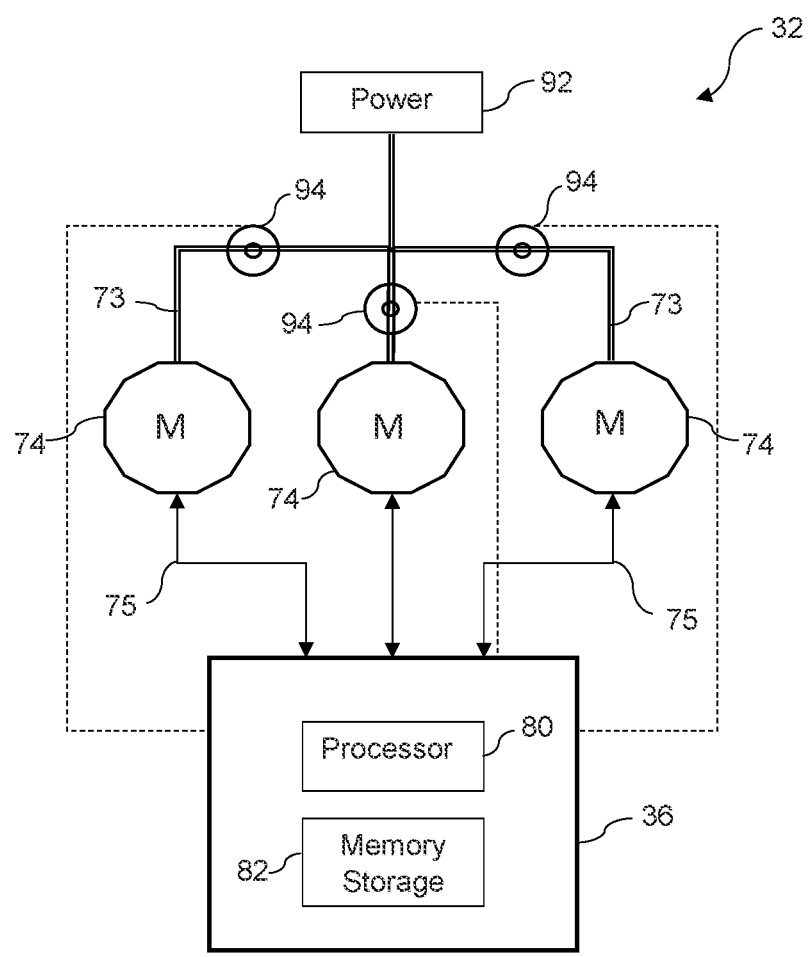
FIG. 4 is a diagram depicting aspects of the method and system of the present disclosure.

Referring to FIG. 4, an embodiment of the pitch control system 32 is schematically depicted wherein a power source 92 (e.g., an electrical bus that supplies internal wind turbine loads) supplies electrical power to each of the pitch actuators represented as motors 74 configured with a respective rotor blade. The controller 36 controls operation of the pitch motors via pitch commands transmitted via paths 75 to individually change the pitch position of the rotor blades 22 based on a number of variables, such as wind speed, power demands, rotor speed, and so forth. It should be appreciated that the controller 36 may be the overall wind turbine controller configured to perform the functionalities described herein, or may be a dedicated pitch controller that is in communication with the wind turbine controller.

In conventional control systems, the electrical characteristics of the pitch motors 74 are directly monitored by the turbine controller 36 via, for example, path 75 for various reasons, such as monitoring the operating state of the motors, run time of the motors, alarm conditions, and so forth. The present method can utilize these existing capabilities, wherein a logic program in the wind turbine controller 36 can also evaluate the electrical characteristic signals already received by the controller 36 for purposes of the present functionalities.

For example, in certain embodiments, the current being drawn by the pitch motors 74 may be monitored by the wind turbine controller 36 (or a pitch controller in communication with the wind turbine controller 36) for any other purpose and may also be the relevant electrical characteristic of interest for the present methodology since it is a direct indication of the motor torque needed to maintain the blades 22 at their commanded pitch angle. In an alternate embodiment, with the measured current value and known system voltage, the pitch motor power is easily calculated and may be the relevant characteristic. This pitch motor power characteristic may be desired if voltage fluctuations exist in the system.

Alternatively, FIG. 4 also depicts an electrical characteristic detection device 94 configured on each of the power lines 73 between the power source 92 and the pitch actuators (e.g., motors 74). In a particular embodiment, the device 94 may be a current transformer that measures current supplied to the pitch motor 74 and transmits the current value via a wired or wireless connection with the controller 36 (processor 80).

Figure 5:
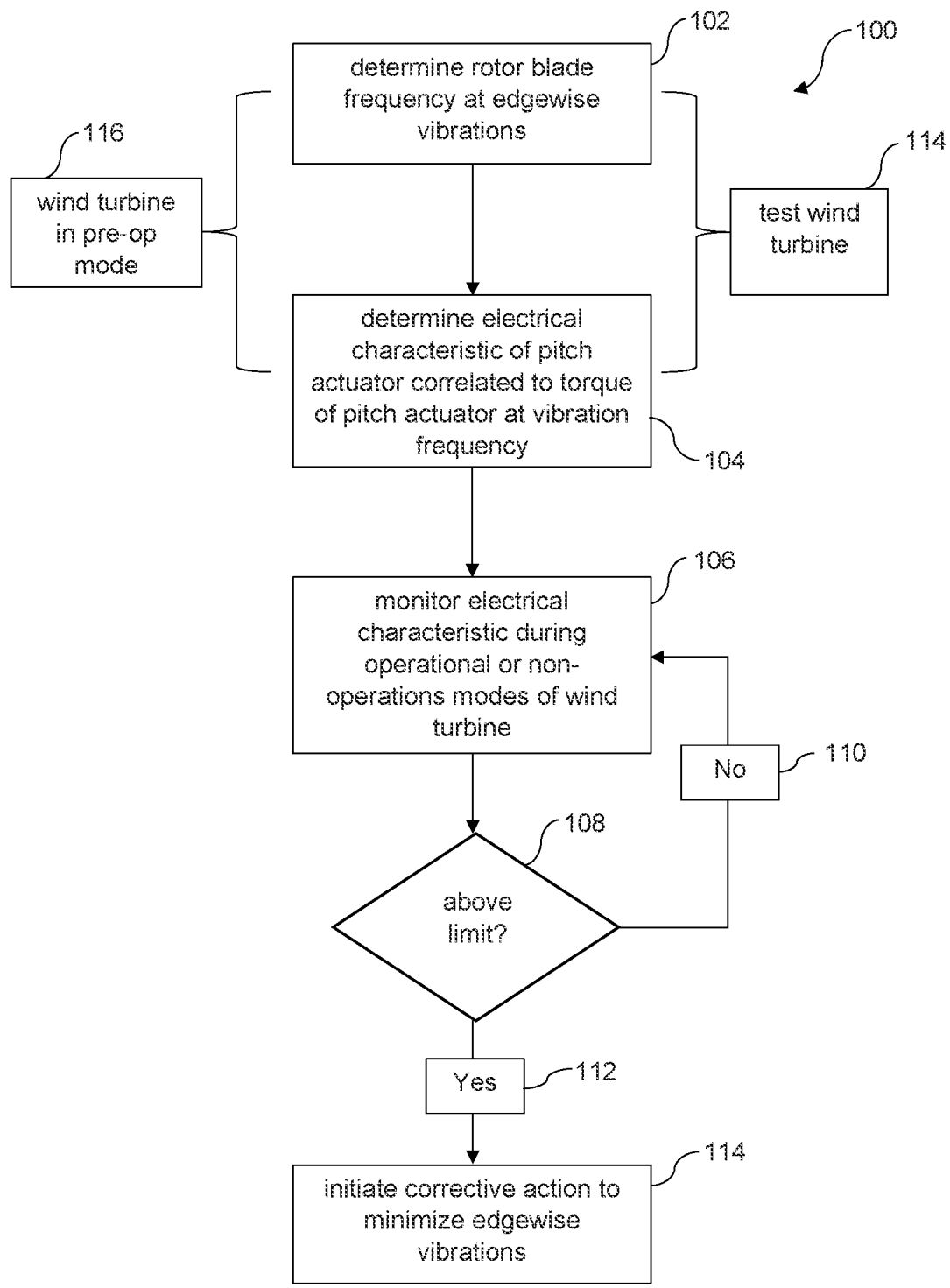
FIG. 5 is a flowchart depicting various method embodiments.

FIG. 5 depicts various method embodiments 100 utilizing the principles described above. At step 102, the method includes, at a given wind speed, determining a frequency or frequency band at which edgewise vibrations are producible in the rotor blade. These frequency values may be predetermined and known for specific turbine blade designs or configurations, or may be determined via modeling or based on past operational data.

At step 104, the method includes determining an electrical characteristic of the pitch actuator (e.g., pitch motor) that correlates to the increased torque required for the pitch actuator to hold a pitch angle of the rotor blade constant at the frequency or frequency band determined in step 102. For example, as discussed above, the current drawn by a pitch motor will increase (or increased motor power) when the pitch motor must supply additional torque at the resonance frequency of the blade to hold the pitch angle constant.

Step 114 indicates that steps 102 and 104 may be conducted in an analysis phase on a test wind turbine having similar blade and pitch motor operational characteristics as the operational wind turbine. It should be appreciated that "similar" is used herein to encompass test blade and test pitch motor characteristics that provide the desired correlation within an acceptable margin between the electrical characteristic and pitch motor torque at the vibration-inducing frequencies of the operational wind turbine.

Step 116 indicates that steps 102 and 104 may be conducted during a pre-operational mode of the wind turbine wherein actual correlated values are of the electrical characteristic are determined.

At step 106, the electrical characteristic of the pitch motor is monitored by the controller, as described above. At the given wind speed, a limit value (e.g., threshold value) is established for the electrical characteristic, wherein the monitored electrical characteristic is continuously or periodically compared to the limit value in a control loop that includes steps 108 and 110. This step may be conducted during an operational power-production mode or non-power-production mode of the wind turbine.

At step 110, if the limit value of the electrical value is not exceeded, the monitoring process continues.

At step 112, if the limit value of the electrical value is exceeded the method moves to step 114 wherein the controller initiates corrective action to minimize the assumed edgewise vibrations or oscillations that are induced (or about to be induced) in the rotor blades. The corrective action may be, for example, any one or combination of: pitching the rotor blade to a different pitch position to reduce individual blade loading, yawing the rotor to reduce blade loading on all of the rotor blades, and shutting down the wind turbine.

At steps 102 and 104, the method 100 may include determining the value of the correlated electrical characteristic of the pitch actuator for a plurality of different wind speeds, wherein these values are stored by the controller (e.g., in the storage 82 discussed above). During the power-production mode of the wind turbine, the corresponding value for the prevalent wind speed is retrieved by the controller and used in steps 106 and 108.

In should be appreciated that the method 100 may be implemented on a single rotor blade/pitch actuator of the wind turbine, wherein the results for the single blade are assumed for all of the rotor blades and the corrective action is taken for all rotor blades.

In an alternate embodiment depicted for example in FIG. 4, the electrical characteristic is monitored for each individual rotor blade, wherein the corrective action can be applied only to the alarming rotor blade, or can be applied to all blades based on the electrical characteristic for any one of the rotor blades exceeding the limit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1: A method for detecting and reducing edgewise vibrations in a rotor blade of a wind turbine, wherein the wind turbine includes a rotor with a plurality of the rotor blades, a wind turbine controller, and a pitch control system with a pitch actuator configured with each of the rotor blades, the method comprising: (a) for a given wind speed, determining a frequency or frequency band at which edgewise vibrations are producible in the rotor blade; (b) determining an electrical characteristic of the pitch actuator that correlates to an increased torque required from the pitch actuator to hold a pitch angle of the rotor blade constant at the frequency or frequency band; (c) monitoring the electrical characteristic of the pitch actuator; and (d) upon the electrical characteristic reaching a predefined limit value indicative of edgewise vibrations being or about to be induced in the rotor blade, initiating corrective action with the wind turbine controller to reduce or prevent the edgewise vibrations.

Clause 2: The clause according to clause 1, wherein the pitch actuator is a pitch motor and the electrical characteristic includes one or more of: pitch motor current, pitch motor voltage, pitch motor power, or pitch motor torque.

Clause 3: The clause according to any one of clauses 1-2, wherein the pitch actuator is a hydraulic actuator and the electrical characteristic includes a signal for one or both of: hydraulic pitch system torque or hydraulic system actuation pressure.

Clause 4: The method according to any one of clauses 1-3, wherein steps (a) and (b) are conducted in an analysis phase on a test wind turbine with test pitch actuators and test rotor blades having similar operational characteristics as the wind turbine pitch actuator and rotor blade, and wherein values of the electrical characteristic of the test pitch actuator correlated to the increased torque of the test pitch actuator are stored in a memory accessible by the controller during the operational power-production mode of the wind turbine.

Clause 5: The method according to any one of clauses 1-4, wherein steps (a) and (b) conducted in the analysis phase on the test wind turbine are conducted at a plurality of different wind speeds.

Clause 6: The method according to any one of clauses 1-5, wherein steps (a) and (b) are conducted in a pre-operational mode of the wind turbine, and wherein values of the electrical characteristic of the pitch actuator correlated the increased torque of the pitch actuator are stored in a memory accessible by the wind turbine controller during the operational power-production mode of the wind turbine.

Clause 7: The method according to any one of clauses 1-6, wherein steps (a) and (b) conducted in the pre-operational mode on the wind turbine are conducted at a plurality of different wind speeds.

Clause 8: The method according to any one of clauses 1-7, wherein the corrective action initiated by the controller is any one or combination of: pitching the rotor blade to a different pitch position to reduce individual blade loading, yawing the rotor to reduce blade loading on all of the rotor blades, and shutting down the wind turbine.

Clause 9: The method according to any one of clauses 1-8, comprising conducting steps (c) and (d) individually for each of the rotor blades.

Clause 10: The method according to any one of clauses 1-9, wherein the corrective action is taken for each of the rotor blades based on the electrical characteristic reaching a predefined limit value for any one of the rotor blades.

Clause 11: The method according to any one of clauses 1-10, wherein the corrective action is taken only for the rotor blade wherein the electrical characteristic reached the predefined limit value.

Clause 12: The method according to any one of clauses 1-11, wherein the step of monitoring the electrical characteristic of the pitch actuator is conducted during an operational power production mode of the wind turbine.

Clause 13: A wind turbine, comprising: rotor blades on a rotatable rotor hub; a pitch system configured to change a pitch angle of the rotor blades, the pitch system comprising an individual pitch actuator configured with each rotor blade; a controller in operable communication with the pitch system, the controller configured to: at a given wind speed during an operational power-production mode of the wind turbine, controlling the pitch actuators to maintain the rotor blades at a desired pitch angle; monitor one or more electrical characteristics of the individual pitch actuators; and for each of the pitch actuators, upon the electrical characteristic reaching a predefined limit value indicative of edgewise vibrations being or about to be induced in the rotor blade, initiating corrective action to reduce or prevent the edgewise vibrations.

Clause 14: The wind turbine according to clause 13, wherein the pitch actuator comprises a pitch motor and the electrical characteristic includes one or more of: pitch motor current, pitch motor voltage, pitch motor power, or pitch motor torque.

Clause 15: The wind turbine according to any one of clauses 13-14, wherein the pitch actuator comprises a hydraulic actuator and the electrical characteristic includes a signal for one or both of: hydraulic pitch system torque or hydraulic system actuation pressure.

Clause 16: The wind turbine according to any one of clauses 13-15, wherein the controller is in communication with a memory storage device, the memory storage device containing stored values of the electrical characteristic of the pitch motors correlated to an increased torque required from the pitch motor to maintain the pitch angle of the rotor blade constant at a blade frequency or frequency band known to induce edgewise vibrations in the rotor blade.

Clause 17: The wind turbine according to any one of clauses 13-16, wherein the memory storage device contains the stored values of the electrical characteristic determined for a plurality of different wind speeds.

Clause 18: The wind turbine according to any one of clauses 13-17, wherein the corrective action initiated by the controller is any one or combination of: pitching the rotor blade to a different pitch position to reduce individual blade loading, yawing the rotor to reduce blade loading on all of the rotor blades, and shutting down the wind turbine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for detecting and reducing edgewise vibrations in a rotor blade of a wind turbine, wherein the wind turbine includes a rotor with a plurality of the rotor blades, a wind turbine controller, and a pitch control system with a pitch actuator configured with each of the rotor blades, the method comprising:
   (a) for a given wind speed, determining a frequency or frequency band of the rotor blades at which edgewise vibrations are producible in the rotor blade;
   (b) determining an electrical characteristic of the pitch actuator that correlates to an increased torque required from the pitch actuator to hold a pitch angle of the rotor blade constant at the frequency or frequency band;
   (c) monitoring the electrical characteristic of the pitch actuator; and
   (d) upon the electrical characteristic reaching a predefined limit value indicative of edgewise vibrations being or about to be induced in the rotor blade, initiating corrective action with the wind turbine controller to reduce or prevent the edgewise vibrations.

2. The method according to claim 1, wherein the pitch actuator is a pitch motor and the electrical characteristic includes one or more of: pitch motor current, pitch motor voltage, pitch motor power, or pitch motor torque.

3. The method according to claim 1, wherein the pitch actuator is a hydraulic actuator and the electrical characteristic includes a signal for one or both of: hydraulic pitch system torque or hydraulic system actuation pressure.

4. The method according to claim 1, wherein steps (a) and (b) are conducted in an analysis phase on a test wind turbine with test pitch actuators and test rotor blades having similar operational characteristics as the wind turbine pitch actuator and rotor blade, and wherein values of the electrical characteristic of the test pitch actuator correlated to the increased torque of the test pitch actuator are stored in a memory accessible by the controller during the operational power-production mode of the wind turbine.

5. The method according to claim 4, wherein steps (a) and (b) conducted in the analysis phase on the test wind turbine are conducted at a plurality of different wind speeds.

6. The method according to claim 1, wherein steps (a) and (b) are conducted in a pre-operational mode of the wind turbine, and wherein values of the electrical characteristic of the pitch actuator correlated to the increased torque of the pitch actuator are stored in a memory accessible by the wind turbine controller during the operational power-production mode of the wind turbine.

7. The method according to claim 6, wherein steps (a) and (b) conducted in the pre-operational mode on the wind turbine are conducted at a plurality of different wind speeds.

8. The method according to claim 1, wherein the corrective action initiated by the controller is any one or combination of: pitching the rotor blade to a different pitch position to reduce individual blade loading, yawing the rotor to reduce blade loading on all of the rotor blades, and shutting down the wind turbine.

9. The method according to claim 1, comprising conducting steps (c) and (d) individually for each of the rotor blades.

10. The method according to claim 9, wherein the corrective action is taken for each of the rotor blades based on the electrical characteristic reaching a predefined limit value for any one of the rotor blades.

11. The method according to claim 9, wherein the corrective action is taken only for the rotor blade wherein the electrical characteristic reached the predefined limit value.

12. The method according to claim 1, wherein the step of monitoring the electrical characteristic of the pitch actuator is conducted during an operational power production mode of the wind turbine.

13. A wind turbine, comprising:
rotor blades on a rotatable rotor hub;
a pitch system configured to change a pitch angle of the rotor blades, the pitch system comprising an individual pitch actuator configured with each rotor blade;
a controller in operable communication with the pitch system, the controller configured to:
at a given wind speed, controlling the pitch actuators to maintain the rotor blades at a desired pitch angle;
monitor one or more electrical characteristics of the individual pitch actuators;
for each of the pitch actuators, upon the electrical characteristic reaching a predefined limit value indicative of edgewise vibrations being or about to be induced in the rotor blade, initiating corrective action to reduce or prevent the edgewise vibrations; and
wherein the controller is in communication with a memory storage device, the memory storage device containing stored values of the electrical characteristic of the pitch actuators correlated to an increased torque required from the pitch actuator to maintain the pitch angle of the rotor blade constant at a blade frequency or frequency band known to induce edgewise vibrations in the rotor blade.

14. The wind turbine according to claim 13, wherein the memory storage device contains the stored values of the electrical characteristic determined for a plurality of different wind speeds.

15. The wind turbine according to claim 13, wherein the pitch actuator comprises a pitch motor and the electrical characteristic includes one or more of: pitch motor current, pitch motor voltage, pitch motor power, or pitch motor torque.

16. The wind turbine according to claim 13, wherein the pitch actuator comprises a hydraulic actuator and the electrical characteristic includes a signal for one or both of: hydraulic pitch system torque or hydraulic system actuation pressure.

17. The wind turbine according to claim 13, wherein the corrective action initiated by the controller is any one or combination of: pitching the rotor blade to a different pitch position to reduce individual blade loading, yawing the rotor to reduce blade loading on all of the rotor blades, and shutting down the wind turbine.

\* \* \* \* \*